(12) United States Patent
Goce et al.

(10) Patent No.: US 10,393,183 B2
(45) Date of Patent: Aug. 27, 2019

(54) AIR CONTROL DEVICE HAVING A BEARING LOCATION

(71) Applicant: Mahle International GmbH, Stuttgart (DE)

(72) Inventors: Richard Goce, Stuttgart (DE); Manuel Klinger, Marbach a. N. (DE)

(73) Assignee: Mahle International GmbH (DE)

( * ) Notice: Subject to any disclaimer, the term of this patent is extended or adjusted under 35 U.S.C. 154(b) by 597 days.

(21) Appl. No.: 14/837,990

(22) Filed: Aug. 27, 2015

(65) Prior Publication Data

US 2016/0059673 A1 Mar. 3, 2016

(30) Foreign Application Priority Data

Aug. 28, 2014 (DE) .......................... 10 2014 217 163

(51) Int. Cl.
*B60H 1/00* (2006.01)
*F16C 35/10* (2006.01)
*F16C 33/72* (2006.01)

(52) U.S. Cl.
CPC ......... *F16C 35/10* (2013.01); *B60H 1/00678* (2013.01); *F16C 33/723* (2013.01); *B60H 2001/00707* (2013.01)

(58) Field of Classification Search
CPC .... F16C 35/10; F16C 33/723; F16C 33/6696; B60H 1/00678; B60H 2001/00707
USPC ......................................................... 454/152
See application file for complete search history.

(56) References Cited

U.S. PATENT DOCUMENTS

| 5,106,018 A | 4/1992 | Loup |
| 7,954,540 B2 * | 6/2011 | Hoehn ................. B60H 1/0005 165/103 |
| 8,105,139 B2 * | 1/2012 | Mateus ............. B60H 1/00685 137/607 |
| 2007/0293135 A1 | 12/2007 | Hori et al. |

(Continued)

FOREIGN PATENT DOCUMENTS

| AT | 149893 B | 6/1937 |
| DE | 671566 C | 2/1939 |

(Continued)

OTHER PUBLICATIONS

German Search Report for File No. 102014217163.6.
(Continued)

*Primary Examiner* — Vivek K Shirsat
*Assistant Examiner* — Ryan L Faulkner
(74) *Attorney, Agent, or Firm* — Fishman Stewart PLLC

(57) ABSTRACT

A bearing location for rotatably supporting a shaft on a carrier structure about a rotation axis may include a bearing opening disposed in the carrier structure. The bearing opening may include an cylindrical inner bearing face on an inner periphery arranged coaxially with the rotation axis. The inner bearing face may interact with a cylindrical outer bearing face disposed on an outer periphery of the shaft. An annular seal may be arranged coaxially with the rotation axis and may include a labyrinth seal have at least one annular rib and at least one annular groove. An inner sealing gap and an outer sealing gap may be disposed radially between walls of the rib and walls of the groove. The inner sealing gap and the outer sealing gap may each extend annularly and may be arranged coaxially with the rotation axis.

18 Claims, 3 Drawing Sheets

(56) References Cited

U.S. PATENT DOCUMENTS

2008/0107369 A1* 5/2008 Fujita .................. F16C 33/34
                                                            384/463
2008/0176502 A1   7/2008 Hashimoto

FOREIGN PATENT DOCUMENTS

| DE | 69100274 T2    | 12/1993 |
|----|----------------|---------|
| DE | 69833474 T2    | 10/2006 |
| DE | 102007026620   | 12/2011 |
| DE | 112012002939 T5 | 4/2014 |
| EP | 0925969        | 2/2006  |
| EP | 2072297        | 6/2009  |
| GB | 466403 A       | 5/1937  |
| WO | WO-2006/037567 | 4/2006  |

OTHER PUBLICATIONS

Bibliographic Data Sheet Indicating No Abstract Available for AT 149893.
English Abstract for DE112012002939.
English Abstract for DE69833474.

* cited by examiner

AIR CONTROL DEVICE HAVING A BEARING LOCATION

CROSS-REFERENCE TO RELATED APPLICATIONS

This application claims priority to German Patent Application No. 10 2014 217 163.6, filed Aug. 28, 2014, the contents of which are hereby incorporated by reference in their entirety.

TECHNICAL FIELD

The present invention relates to a bearing location for rotatably supporting a shaft on a carrier structure about a rotation axis. The invention further relates to an air control device which is provided with such a bearing location for an air-conditioning unit. The present invention further relates to an air-conditioning unit for a vehicle for air-conditioning a vehicle inner space which is provided with such an air control device.

BACKGROUND

EP 0 925 969 B1 discloses an air control device for an air-conditioning unit which has a housing for constructing at least one channel for guiding an air flow and at least one flap valve for controlling the air flow in the channel, the flap valve being arranged in the housing so as to be able to be rotated about a rotation axis for opening and closing the channel. To this end, the flap valve has a shaft, from which at least one wing protrudes. The shaft is rotatably supported about the rotation axis at least at one of the longitudinal ends thereof by means of a bearing location on a wall of the housing acting as a carrier structure. The bearing location which is constructed in this instance comprises a bearing opening which is formed in the carrier structure and through which the shaft protrudes. Furthermore, the bearing location is provided with an annular seal which is arranged coaxially relative to the rotation axis for sealing the bearing opening. With the known bearing location, the seal is formed by means of an annular sealing gap which is arranged coaxially relative to the rotation axis and which is constructed radially between an annularly extending cylindrical inner wall which is arranged in a rotationally secure manner on the shaft and an annularly extending cylindrical outer wall which is arranged on the carrier structure. Furthermore, the bearing opening of the bearing location has at the inner periphery thereof a cylindrical inner bearing face which is arranged coaxially relative to the rotation axis, the shaft having on the outer periphery thereof a cylindrical outer bearing face which is arranged coaxially relative to the rotation axis and which is in planar abutment with the inner bearing face.

In the known bearing location, the seal is axially spaced apart with respect to an axial portion of the shaft, in which the outer bearing face cooperates with the inner bearing face in order to support the shaft.

Other air control devices having bearing locations are known from WO 2006/037567 A1, EP 2 072 297 A1 and DE 10 2007 026 620 B4.

SUMMARY

The present invention addresses the problem of providing, for a bearing location of the type mentioned in the introduction or for an air control device which is provided with at least one such bearing location, an improved embodiment, which is distinguished in particular by an increased sealing in the region of the bearing location. Furthermore, an axially compact structure in the region of the bearing location is desired.

According to the invention, this problem is solved by the subject-matter of the independent claim. Advantageous embodiments are set out in the dependent claims.

The invention is based on the general notion of constructing the seal as a labyrinth-like seal, wherein the labyrinth-like seal comprises at least one annular rib and at least one annular groove, with the respective rib protruding axially into the respective groove. The respective rib has two outer walls which face away from each other in the radial direction and which extend annularly in a closed manner in the peripheral direction and which are preferably constructed in a cylindrical manner. The groove itself has two inner walls, which face each other with respect to the radial direction and which also extend annularly in a closed manner in the peripheral direction and which are constructed in particular in a cylindrical manner. The respective rib and the respective groove are adapted to each other with respect to their respective radial dimensions in such a manner that the inner wall which is arranged proximally with respect to the rotation axis forms an inner sealing gap with the outer wall which is arranged proximally with respect to the rotation axis, whilst at the same time the inner wall which is arranged distally with respect to the rotation axis forms an outer sealing gap with the outer wall which is arranged distally with respect to the rotation axis. The respective sealing gap extends in this instance in an annular manner and is arranged coaxially with respect to the rotation axis. Furthermore, the respective sealing gap is formed radially between the associated inner wall and the associated outer wall and extends in the axial direction, in accordance with the axial overlap between the rib and the groove.

As a result of the use of a labyrinth-like seal, which has at least two concentric sealing gaps, the efficiency of the sealing of the shaft with respect to the carrier structure can be considerably improved. It is further particularly advantageous that such a labyrinth-like seal functions in an almost maintenance-free manner. In particular, lubrication can be dispensed with.

According to an advantageous embodiment, an inner radial play between the inner wall of the respective groove, which wall is proximal with respect to the rotation axis, and the outer wall of the respective rib, which wall is proximal with respect to the rotation axis, may be smaller than an axial spacing between a groove base and an end wall of the rib. Additionally or alternatively, an outer radial play between the inner wall of the respective groove, which wall is distal with respect to the rotation axis, and the outer wall of the respective rib, which wall is distal with respect to the rotation axis, may be smaller than the axial spacing between the groove base and the end wall of the rib. The relationships mentioned are present at least at ambient temperature. These relationships enable a simple construction of the labyrinth-like seal since a precise axial positioning between the shaft and carrier structure is not the important aspect in order to achieve the desired sealing action. To this end, only the most coaxial positioning possible of the shaft within the bearing opening is required so that the respective rib can engage axially in the respective groove in order to construct the two radial sealing gaps. The respective radial play is smaller in order to produce the respective sealing gap, preferably at least 10 times smaller than a rib width or a groove width which is measured in the radial direction.

According to another advantageous embodiment, in an axial portion of the shaft the respective rib can axially engage in the respective groove, in which portion the outer bearing face cooperates radially with the inner bearing face in order to rotatably support the shaft on the carrier structure. Consequently, the labyrinth-like seal is located directly radially adjacent to the bearing opening, whereby the bearing location is generally constructed in a comparatively compact manner in the axial direction and accordingly requires little structural space.

In another advantageous embodiment, at least one such rib may be constructed on the shaft, in particular on an annular step of the shaft, wherein it is then advantageously arranged radially with spacing from the outer bearing face. The associated groove is then constructed on the carrier structure and arranged in this instance radially with spacing from the bearing opening. An extremely compact construction in the axial direction is also thereby produced for the respective bearing location.

An air control device according to the invention is characterized in that at least one flap valve for controlling an air flow has a shaft which is rotatably supported about a rotation axis with at least one bearing location of the type described above on a wall of the housing acting as a carrier structure. The sealing is also improved thereby for the air control device in the region of the bearing locations.

According to an advantageous embodiment, the respective flap valve may have at least two wings, which protrude from the shaft at different peripheral portions of the shaft. A flap valve having precisely two wings can also be described as a butterfly valve. Such a flap valve is distinguished in particular in that, in order to adjust the flap valve, only comparatively low torques are required.

According to an advantageous development, at least two wings of the flap valve may have different sizes radially with respect to the rotation axis. The flap valve is thereby asymmetrical, which is advantageous for specific applications. In particular, the shaft can thereby be more readily arranged in an edge region of the respective channel.

In another advantageous development, there may be provision for the flap valve to have precisely two wings which in the peripheral direction form a wing angle which is different from 180°. This structure also supports complex installation situations, in particular together with an eccentric arrangement of the flap valve with respect to the channel.

In another advantageous embodiment, the shaft in the channel may be arranged with spacing from a longitudinal centre axis of the channel. A reduced flow resistance is thereby produced for the flap valve in the open state.

In another advantageous embodiment, at least one such flap valve in the housing may serve to adjust a mixture relationship between circulating air and fresh air. Additionally or alternatively, at least one such flap valve may serve to adjust a mixture relationship between hot air and cold air. Additionally or alternatively, at least one such flap valve in the housing may serve to adjust a volume flow for the air flow in the respective channel. Consequently, different functions are produced for the respective flap valve within the housing.

An air-conditioning unit according to the invention which serves to air-condition a vehicle inner space in a vehicle is provided with an air control device of the type described above.

Other important features and advantages of the invention will be appreciated from the dependent claims, from the drawings and from the associated description of the Figures with reference to the drawings.

Of course, the features which are mentioned above and which will be explained below can be used not only in the combination set out, but also in other combinations or alone, without departing from the scope of the present invention.

Preferred embodiments of the invention are illustrated in the drawings and are explained in greater detail in the following description, the same reference numerals referring to components which are the same or similar or which are functionally identical.

DETAILED DESCRIPTION

Figure 1:
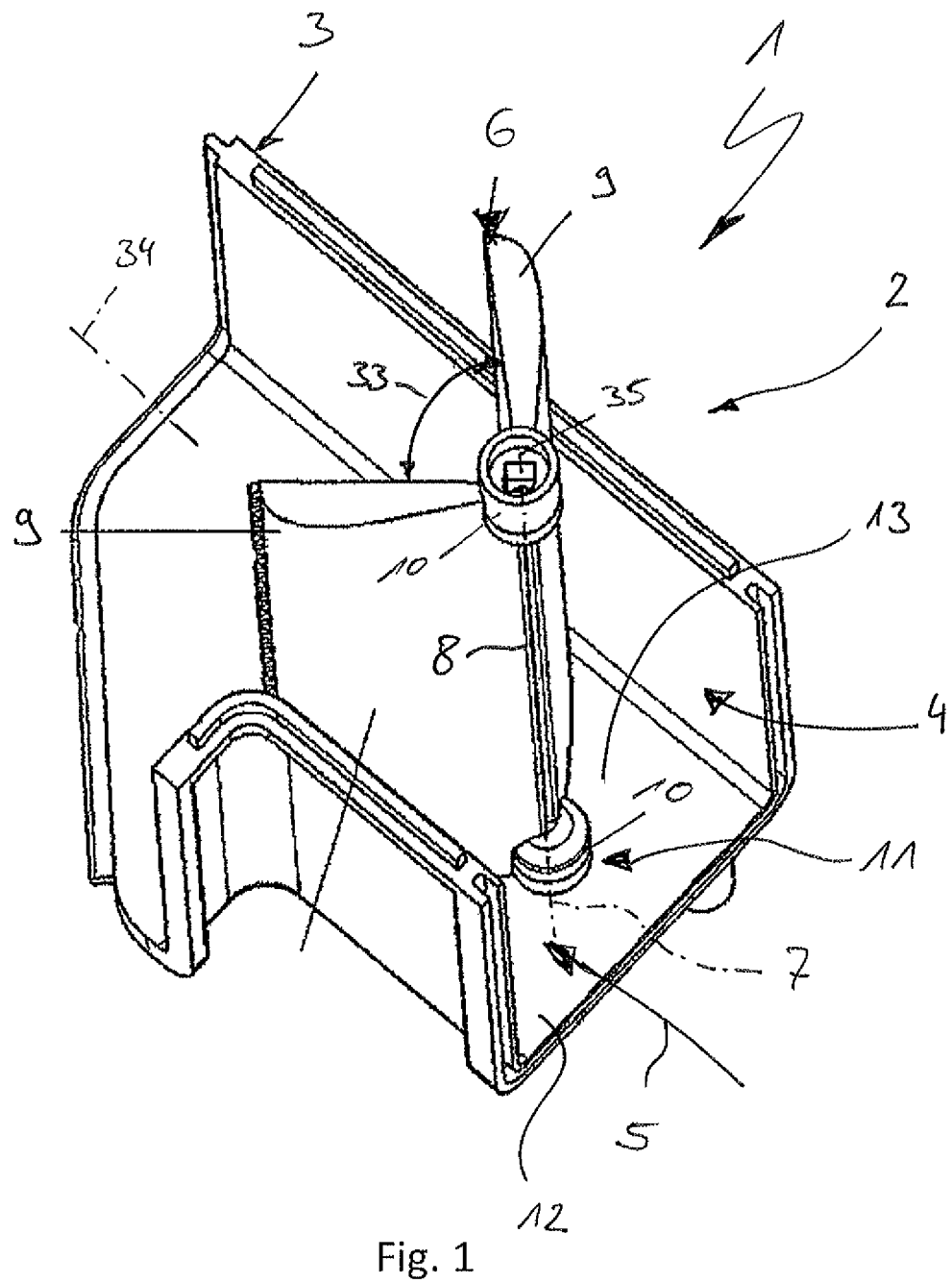
FIG. 1 is a highly simplified sectioned illustration of an air-conditioning unit in the region of an air control device.

According to FIG. 1, an air-conditioning unit 1, by means of which a vehicle inner space of a vehicle, preferably a road vehicle, can be air-conditioned, comprises at least one air control device 2. The air-control device 2 has a housing 3, which is illustrated here in the open state and which is used to construct at least one channel 4 which is itself used to guide an air flow 5 which is indicated by means of an arrow. The air control device 2 is further provided with at least one flap valve 6, which serves to control the air flow 5 in the channel 4 and which is arranged for this purpose so as to be able to be rotated about a rotation axis 7 in the housing 3. In this instance, the flap valve 6 can open and close the channel 4 depending on the rotational position. Furthermore, as many intermediate positions as desired are also possible between the open position and the closed position.

The flap valve 6 has a shaft 8, from which at least one wing 9 protrudes. In the example of FIG. 1, two wings 9 protrude from the shaft 8. The shaft 8 is supported at least at one of the longitudinal ends 10 thereof by means of a bearing location 11 on the housing 3 so as to be able to be rotated about the rotation axis 7. The bearing location 11 in this instance is constructed in a wall 12 of the housing 3, which wall is used for this purpose as a carrier structure 13. Advantageously, the flap valve 6 is supported at both longitudinal ends 10 of the shaft 8 using such a bearing location 11 on the housing 3.

Figure 2:
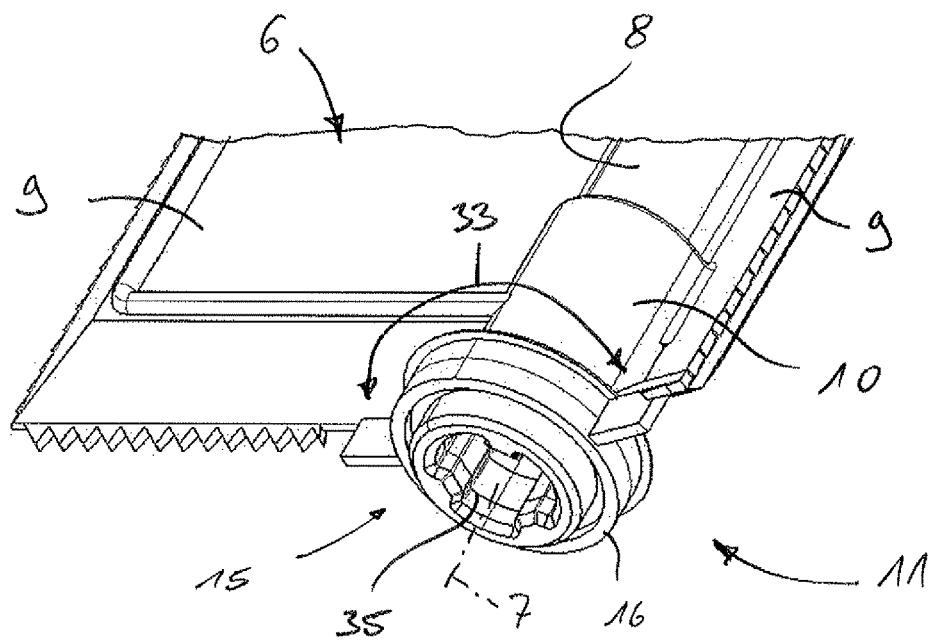
FIG. 2 is an isometric view of a flap valve in the region of a bearing location.
Figure 3:
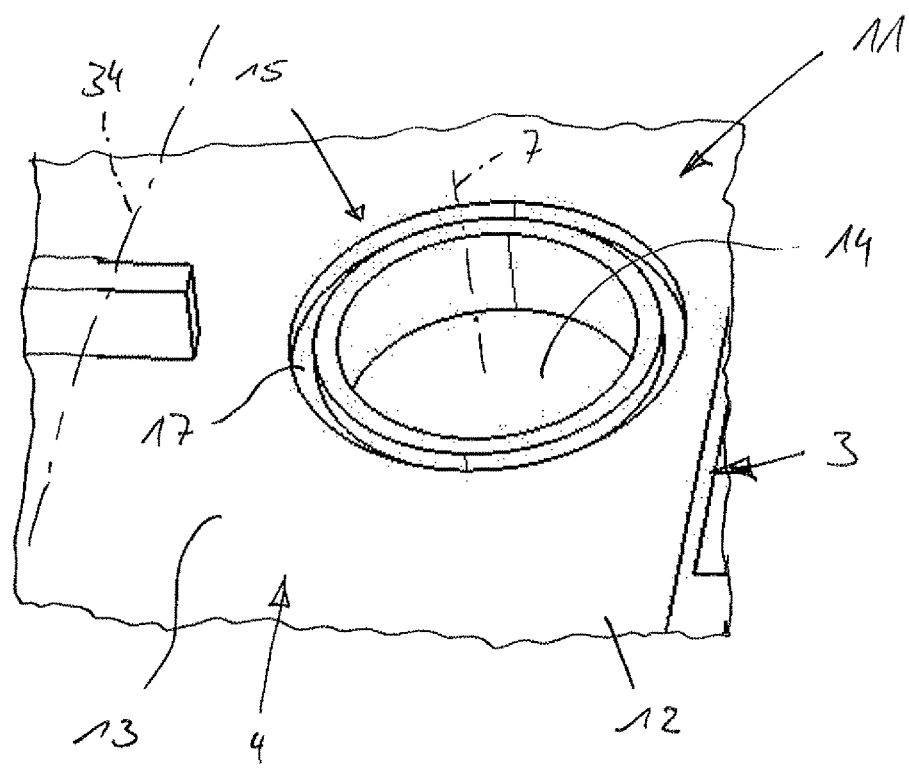
FIG. 3 is an isometric view of a housing of the air control device in the region of the bearing location.
Figure 4:
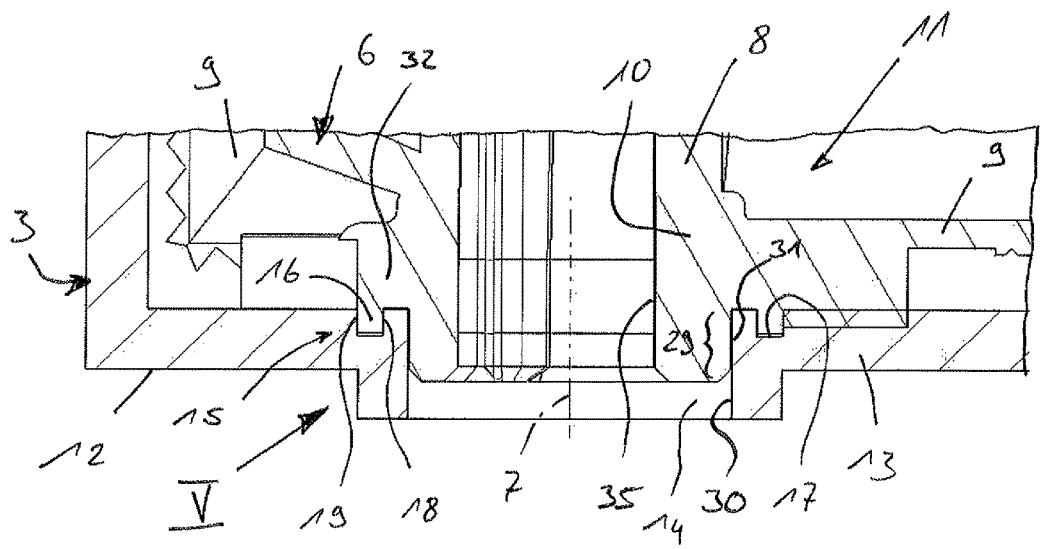
FIG. 4 is a sectioned view of the bearing location.
Figure 5:
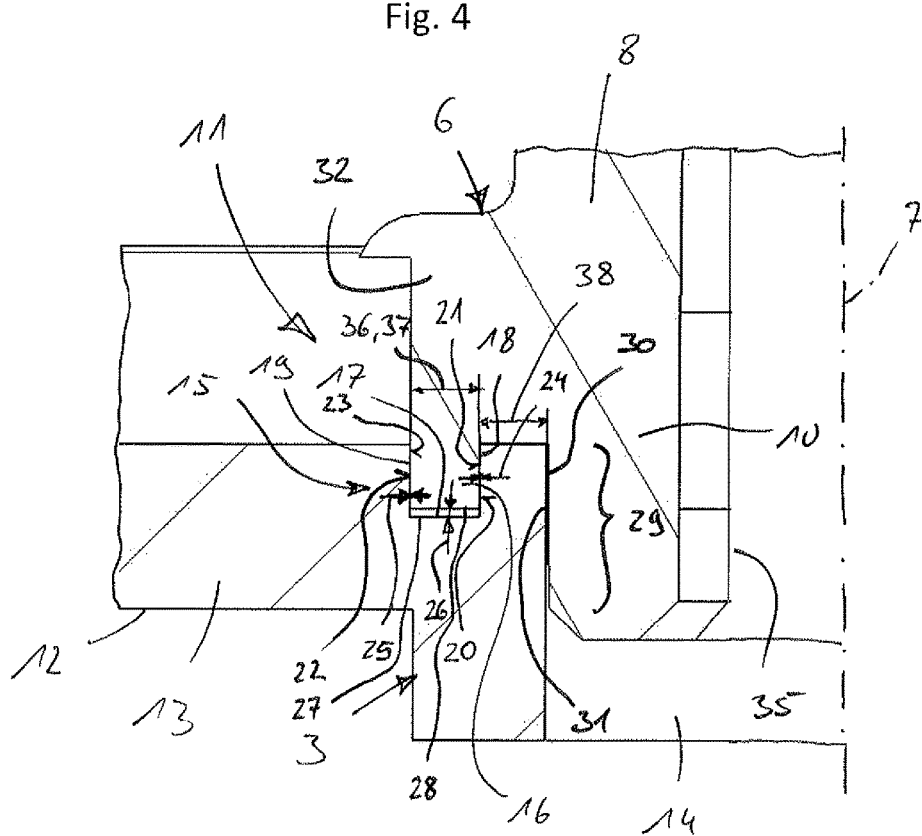
FIG. 5 is an enlarged detail IV from FIG. 4.

According to FIGS. 2 to 5, the respective bearing location 11, which serves to rotatably support the shaft 8 on the carrier structure 13 about the rotation axis 7, comprises a bearing opening 14 which is constructed in the carrier structure 13. The carrier structure 13 is as mentioned formed in this instance by a region of the wall 12 of the housing 3. In the assembled state which is shown in FIGS. 4 and 5, the shaft 8 protrudes axially into the bearing opening 14 and terminates within the bearing opening 14. In principle, however, an embodiment is also conceivable in which the shaft 8 extends through the bearing opening 14.

The bearing location 11 is further provided with a labyrinth-like seal 15 which is arranged coaxially relative to the rotation axis 7, extends in an annular manner and serves to seal the bearing opening 14. To this end, the labyrinth-like seal 15 has at least one annular rib 16 and at least one annular groove 17. In the assembled state, the rib 16 engages axially in the groove 17. The axial direction is in this instance defined by the longitudinal direction of the rotation axis 7. In the example shown here, the labyrinth-like seal 15 has only one rib 16 and only one groove 17. In other embodiments, a plurality of ribs 16 may also be provided with a plurality of complementary grooves 17. Furthermore, in the example, the rib 16 is constructed on the shaft 8, in particular integrally formed thereon. In contrast to this, the groove 17 is constructed in the carrier structure 13. In principle, however, a transposed structure is also conceivable in which the groove 17 is constructed on the shaft 8, whilst the rib 16 is located on the carrier structure 13. However, the embodiment shown here, in which the rib 16 is located on the shaft 8, is particularly compact.

The labyrinth-like seal 15 is distinguished in the assembled state of the bearing location 11 according to FIGS. 4 and 5 by two sealing gaps, that is to say, by an inner sealing gap 18 which is arranged proximally with respect to the rotation axis 7 and an outer sealing gap 19 which is arranged distally with respect to the rotation axis 7. The two sealing gaps 18, 19 are arranged coaxially one inside the other and coaxially with respect to the rotation axis 7, the inner sealing gap 18 extending radially within the outer sealing gap 19. The inner sealing gap 18 according to FIG. 5 is constructed radially between an outer wall 20 of the rib 16, which wall is proximal with respect to the rotation axis 7, and an inner wall 21 of the groove 17, which wall is proximal with respect to the rotation axis 7. In contrast, the outer sealing gap 19 is constructed radially between an outer wall 22 of the rib 16, which wall is distal with respect to the rotation axis 7, and an inner wall 23 of the groove 17, which wall is distal with respect to the rotation axis 7. The radial direction therefore relates to the rotation axis 7 in which it is located in a perpendicular manner.

In the region of the axial overlap between the rib 16 and groove 17, which overlap corresponds to an axial introduction depth of the rib 16 into the groove 17, the sealing gaps 18, 19 extend axially, whereby the respective sealing gap 18, 19 has a corresponding axial gap length. The larger this axial gap length is, the more efficiently the respective sealing gap 18, 19 seals. Furthermore, a radial play within the respective sealing gap 18, 19 is additionally responsible for the sealing effect. The inner sealing gap 18 has an inner radial play 24, whilst the outer sealing gap 19 has an outer radial play 25. The inner radial play 24 is located radially between the proximal inner wall 20 and the proximal outer wall 21 and is advantageously smaller than an axial spacing 26, which is present between a groove base 27 of the groove 17 and an axial end wall 28 of the rib 16. The outer radial play 25 is located radially between the distal outer wall 22 and the distal inner wall 23 and is also smaller than the axial spacing 26. The smaller the radial play 24, 25, the greater the sealing action. In the example, the respective radial play 24, 25 is significantly smaller, for example, at least 20 times smaller, than a radially measured width 36 of the rib 16 or than a radially measured width 37 of the groove 17.

As can be seen in particular in FIGS. 4 and 5, the labyrinth-like seal 15 is constructed in an axial portion 29 of the shaft 8, in which portion the shaft 8 engages in the bearing opening 14 and in which the shaft 8 is supported on the carrier structure 13. To this end, the bearing opening 14 has on the inner periphery thereof a cylindrical inner bearing face 30 which is arranged coaxially relative to the rotation axis 7, whilst the shaft 8 has on the outer periphery thereof a cylindrical outer bearing face 31 which is arranged coaxially relative to the rotation axis 7. The outer bearing face 31 is in this instance directly in planar abutment with the inner bearing face 30 in a radial manner. The cooperation of the inner bearing face 30 with the outer bearing face 31 for rotatably supporting the shaft 8 on the carrier structure 13 is carried out in the said axial portion 29, in which the labyrinth-like seal 15 is also arranged, but in a state radially offset with respect to the bearing faces 30, 31. In particular, the engagement of the rib 16 in the associated groove 17 is carried out in the said axial portion 29, but in a state radially offset with respect to the bearing opening 14. In order to form the rib 16, the shaft 8 can be provided with an annular step 32. In any case, the rib 16 is arranged with radial spacing with respect to the outer bearing face 31 on the shaft 8. The groove 17 is arranged on the carrier structure 13 so as to be radially spaced apart with respect to the bearing opening 14.

In the example of FIGS. 4 and 5, a radial spacing 38 between the outer bearing face 31 and the proximal outer wall 20 of the web 16 is substantially of the same size as the radial spacing between the two outer walls 20, 22 of the rib 16, which spacing corresponds to the rib width 36.

As can be seen in particular in FIGS. 1 and 2, the flap valve 6 in the example has precisely two wings 9, which protrude from the shaft 8 at various peripheral portions. In the embodiment shown in FIG. 2, the two wings 9 are of different sizes in the radial direction with respect to the rotation axis 7. According to FIG. 2, the left wing 9 has in the radial direction a significantly larger dimension than the right wing 9. Furthermore, with the flap valves 6 of FIGS. 1 and 2, there is provision for the two wings 9 to form a wing angle 33 which is different from 180° in the peripheral direction.

In the embodiment shown in FIG. 1, the shaft 8 is arranged in the region of a longitudinal centre axis 34 of the channel 4 in the channel 4. In contrast, FIG. 3 shows an embodiment, in which the shaft 8 or the rotation axis 7 in the channel 4 is arranged with spacing from the longitudinal centre axis 34 of the channel 4. There is thereby produced for the respective flap valve 6 with respect to the channel 4 an eccentric or off-centre arrangement.

In the housing 3, the respective flap valve 6 serves, for example, to adjust a mixing relationship between circulating air and fresh air. Such a flap valve 6 in the housing 3 may also serve to adjust a mixing relationship between hot air and cold air. Furthermore, such a flap valve 6 may serve in the housing 3 to adjust a volume flow for the air flow 5.

As can be seen in FIGS. 1, 2, 4 and 5, the shaft 8 is configured at least in the region of the respective longitudinal end 10 thereof as a hollow shaft so that it has an opening 35 which is open at the end face. The opening 35 advantageously serves to axially introduce a drive member which is, however, not shown here. As a result of a non-round embodiment of an inner periphery of the opening 35, a torque transmission between the respective drive member and the shaft 8 can be produced. The respective drive member may in particular engage through the bearing opening 14 into the shaft 8. Consequently, the torque transmission is carried out at the location of the bearing location 11 which is advantageous for the mechanical loading of the flap valve 6.

The invention claimed is:

1. A bearing location for rotatably supporting a shaft about a rotation axis on a carrier structure provided by a wall section, comprising:
    a bearing opening disposed in the carrier structure and configured to receive the shaft;

an annular seal arranged coaxially with respect to the rotation axis for sealing the bearing opening;

the bearing opening including a cylindrical inner bearing face on an inner periphery and arranged coaxially with respect to the rotation axis;

the cylindrical inner bearing face of the bearing opening being configured to interact with a cylindrical outer bearing face disposed on an outer periphery of the shaft, wherein the cylindrical outer bearing face is arranged coaxially relative to the rotation axis;

the cylindrical outer bearing face being in planar engagement with the cylindrical inner bearing face;

the annular seal is structured as a labyrinth seal including at least one annular rib and at least one annular groove, the at least one annular rib arranged axially within the at least one annular groove, wherein the at least one annular rib includes two outer walls facing away from each other and an end wall disposed between the two outer walls, and the at least one annular groove includes two inner walls facing towards each other and a groove base disposed between the two inner walls;

the at least one annular rib and the at least one annular groove structured and arranged to define an inner sealing gap and an outer sealing gap disposed radially between the two outer walls of the at least one annular rib and the two inner walls of the at least one annular groove, wherein the inner sealing gap and the outer sealing gap each extend annularly and are arranged coaxially to the rotation axis with the inner s sling gap being radially separated from the outer sealing gap via the at least one annular rib;

wherein the inner sealing gap has an inner radial play between a first one of the two inner walls of the at least one annular groove and a first one of the two outer walls of the at least one annular rib disposed proximal to the rotation axis, and the outer sealing gap has an outer radial play between a second one of the two inner walls of the at least one annular groove and a second one of the two outer walls of the at least one annular rib disposed distal to the rotation axis; and wherein at least one of the inner radial play of the inner sealing gap and the outer radial play of the outer sealing gap is smaller than an axial spacing defined between the end wall and the groove base, and wherein the at least one of the inner radial play and the outer radial play is at least 10 times smaller than a radially measured width of the at least one annular rib to facilitate sealing the inner sealing gap and the outer sealing gap, receptively.

2. The bearing location according to claim 1, wherein the inner radial play of the inner sealing gap and the outer radial play of the outer sealing gap are each smaller than the axial spacing and are each at least 10 times smaller than the radially measured width of the at least one annular rib.

3. The bearing location according to claim 1, wherein the at least one annular rib engages axially in the at least one annular groove at an axial portion of the shaft, and wherein the cylindrical outer bearing face cooperates radially with the cylindrical inner bearing face at the axial portion of the shaft.

4. The bearing location according to claim 1, wherein at least one of the at least one annular rib is disposed on the shaft and the at least one annular groove is disposed on the carrier structure.

5. The bearing location according to claim 1, wherein the inner radial play and the outer radial play are each at least 20 times smaller than the radially measured width of the annular rib to facilitate an efficient sealing action of the inner sealing gap and the outer sealing gap for sealing an open space running axially between the two outer walls of the at least one annular rib and the two inner walls the at least one annular groove.

6. The bearing location according to claim 1, wherein a radial spacing provided between the cylindrical outer bearing face and the first one of the two outer walls of the at least one annular rib is equal to the radially measured width of the at least one annular rib.

7. An air control device for an air-conditioning unit, comprising:

a housing including a channel for guiding an air flow;

at least one flap valve for controlling the air flow in the channel, wherein the at least one flap valve is arranged in the housing and is rotatable about a rotation axis to open and close the channel;

the at least one flap valve including a shaft and at least one wing protruding from the shaft;

the shaft being rotatably supported about the rotation axis on at least one longitudinal end via a bearing location disposed on a wall of the housing, the wall providing a carrier structure for rotatably supporting the shaft, wherein the bearing location includes:

a bearing opening disposed in the carrier structure and configured to receive the shaft, the bearing opening including a cylindrical inner bearing face on an inner periphery arranged coaxially with respect to the rotation axis;

a cylindrical outer bearing face disposed on an outer periphery of the at least one longitudinal end of the shaft and arranged coaxially with respect to the rotation axis, wherein the cylindrical outer bearing face is arranged in planar engagement with the cylindrical inner bearing face;

an annular seal arranged coaxially with respect to the rotation axis for sealing the bearing opening, the annular seal configured as a labyrinth seal including an annular rib arranged in an annular groove, the annular rib including two outer walls facing away from each other and the annular groove including two inner walls facing toward each other, wherein the annular groove defines a groove base and the annular rib defines an end wall facing the groove base, and an axial spacing is disposed between the groove base and the end wall;

the annular rib and the annular groove structured and arranged to provide an inner sealing gap and an outer sealing gap disposed radially between the two outer walls of the annular rib and the two inner walls of the annular groove where the inner sealing gap and the outer sealing gap run axially along the annular rib and the annular groove, the inner sealing gap and the outer sealing gap each extending annularly and are arranged coaxially with respect to the rotation axis, wherein the inner sealing gap is radially separated from the outer sealing gap via the annular rib;

wherein the inner sealing gap has an inner radial play between one of the two inner walls of the annular groove and one of the two outer walls of the annular rib disposed proximal to the rotation axis with respect to the other of the two inner walls of the annular groove and the other of the two outer walls of the annular rib, and the outer sealing gap has an outer radial play between one of the two inner walls of the annular groove and one of the two outer walls of the annular rib disposed distal to the rotation axis with respect to the other of the two inner walls of the annular groove and the other of the two outer walls of the annular rib; and wherein at least one of the inner radial play of the inner sealing gap and the outer radial play of the outer sealing gap is smaller than the axial spacing, and wherein the at least one of the inner radial play and the outer radial play is at least 10 times smaller than a radially measured width of the annular rib to facilitate sealing the inner sealing gap and the outer sealing gap, respectively.

8. The device according to claim 7, wherein the at least one flap valve has at least two wings protruding from the shaft at different peripheral portions of the shaft.

9. The device according to claim 8, wherein the at least two wings are of different radial sizes with respect to the rotation axis.

10. The device according to claim 8, wherein the at least one flap valve has precisely two wings arranged in a peripheral direction to define a wing angle that is different from an angle of 180°.

11. The device according to claim 7, wherein the shaft is arranged in the channel and includes a spacing from a longitudinal centre axis of the channel.

12. The device according to claim 7, wherein at least one of:
the at least one flap valve in the housing is configured to adjust a mixture relationship between a circulating air and a fresh air,
the at least one flap valve in the housing is configured to adjust a mixture relationship between a hot air and a cold air, and
the at least one flap valve in the housing is configured to adjust a volume flow of the air flow in the channel.

13. The device according to claim 7, wherein the annular groove is disposed on the carrier structure and is recessed from a surface of the wall defining part of the channel for guiding the air flow, the annular rib engaging axially into the annular groove at an axial portion of the shaft that engages with the bearing opening, the axial portion corresponding to an axial overlap between the cylindrical outer bearing face radially abutting the cylindrical inner bearing face, and wherein the inner sealing gap and the outer sealing gap are arranged racially offset and axially aligned with the axial overlap between the cylindrical outer bearing face and the cylindrical inner bearing face.

14. The device according to claim 7, wherein the inner radial play and the outer radial play are each smaller than the axial spacing and at least 20 times smaller than the radially measured width of the annular rib to facilitate an efficient sealing action of the inner sealing gap and the outer sealing gap for sealing an open space running axially between the two outer walls of the annular rib and the two inner walls of the annular groove.

15. An air-conditioning unit for air-conditioning a vehicle inner space, comprising:
an air control device, the air control device including:
a housing including a channel for guiding an air flow;
at least one flap valve for controlling the air flow in the channel, wherein the at least one flap valve is arranged in the housing and is rotatable about a rotation axis to open and close the channel, the at least one flap valve having a shaft and at least one wing protruding from the shaft;
a bearing location disposed on a wall of the housing and rotatably supporting the shaft at a longitudinal end about the rotation axis, the wall defining part of the channel and providing a carrier structure for rotatably supporting the shaft, and wherein the bearing location includes:
a bearing opening disposed in the carrier structure and configured to receive the longitudinal end of the shaft, the bearing opening including a cylindrical inner bearing face on an inner periphery arranged coaxially to the rotation axis;
a cylindrical outer bearing face disposed on an outer periphery of the longitudinal end of the shaft and arranged coaxially with respect to the rotation axis, wherein the cylindrical outer bearing face is arranged in planar engagement with the cylindrical inner bearing face at an axial portion of the shaft that engages with the bearing opening;
an annular seal arranged coaxially with respect to the rotation axis for sealing the bearing opening, wherein the annular seal is configured as a labyrinth seal including an annular rib arranged in an annular groove, the annular rib including two outer walls facing away from each other and an end wall disposed between the two outer walls, and the annular groove including two inner walls facing toward each other and a groove base disposed between the two inner walls;
the annular rib and the annular groove structured and arranged to define an inner sealing gap and an outer sealing gap disposed radially between the two outer walls of the annular rib and the two inner walls of the annular groove, the inner sealing gap disposed radially spaced from the outer sealing gap via the annular rib, wherein the inner sealing gap and the outer sealing gap each extend annularly and are arranged coaxially with respect to the rotation axis;
wherein an inner radial play of the inner sealing gap and an outer radial play of the outer sealing gap are each at least 10 times smaller than a radially measured width of the annular rib to facilitate sealing the inner sealing gap and the outer sealing gap; and
wherein the annular groove is disposed on the carrier structure and is recessed from a surface of the wall facing the channel, the annular rib engaging axially into the annular groove, and wherein an axial overlap of the annular rib engaging into the annular groove is disposed radially offset and axially aligned with the axial portion where the cylindrical outer bearing face is arranged in planar engagement with the cylindrical inner bearing face.

16. The unit according to claim 15, wherein at least the outer sealing gap extends from the end wall of the annular rib in an axial direction of the rotation axis and opens into the channel providing the outer sealing gap with an axial length corresponding to the axial overlap between the annular rib and the annular groove.

17. The unit according to claim 15, wherein:
the annular groove and the annular rib are arranged to provide an axial spacing disposed between the groove base and the end wall;
the inner radial play is disposed between one of the two inner walls of the annular groove and one of the two outer walls of the annular rib each disposed proximal to the rotation axis with respect to the other of the two inner walls of the annular groove and the other of the two outer walls of the annular rib, and the outer radial play is disposed between one of the two inner walls of the annular groove and one of the two outer walls of the annular rib disposed distal to the rotation axis with respect to the other of the two inner walls of the annular groove and the other of the two outer walls of the annular rib; and wherein at least one of the inner radial play of the inner sealing gap and the outer radial play of the outer sealing gap is smaller than the axial spacing.

18. The unit according to claim 15, wherein the annular seal is a lubricant-free labyrinth seal.

* * * * *